United States Patent
Kinder et al.

(10) Patent No.: US 6,915,515 B2
(45) Date of Patent: Jul. 5, 2005

(54) METHOD FOR CREATING PATH-SENSITIVE BRANCH REGISTRY FOR CYCLIC DISTRIBUTED TRANSACTIONS

(75) Inventors: Stephen J. Kinder, Poughkeepsie, NY (US); Steven J. Greenspan, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 09/742,316

(22) Filed: Dec. 21, 2000

(65) Prior Publication Data

US 2002/0083115 A1 Jun. 27, 2002

(51) Int. Cl.[7] ............................................. G06F 9/00
(52) U.S. Cl. ...................................... 718/101; 707/200
(58) Field of Search .......................... 718/101; 707/200, 707/202

(56) References Cited

U.S. PATENT DOCUMENTS

| | | | |
|---|---|---|---|
| 5,193,188 A | | 3/1993 | Franasek et al. |
| 5,371,886 A | * | 12/1994 | Britton et al. ............... 707/202 |
| 5,432,926 A | * | 7/1995 | Citron et al. .................. 714/4 |
| 5,687,388 A | | 11/1997 | Wooten et al. |
| 5,897,638 A | | 4/1999 | Lasser et al. |
| 5,956,506 A | * | 9/1999 | Cobb et al. .................. 718/101 |
| 6,442,618 B1 | * | 8/2002 | Phillips et al. ............... 719/315 |

* cited by examiner

Primary Examiner—Meng-Al T. An
Assistant Examiner—Li Zhen
(74) Attorney, Agent, or Firm—William A. Kinnaman; Cantor Colburn LLP

(57) ABSTRACT

An exemplary embodiment of the invention is a method for providing a path-sensitive branch registry for cyclic distributed transactions. This method requires that a superior node's transaction manager (TM) identify itself as the root followed by sending the syncpoint cue to at least one subordinate node. Before sending the syncpoint cues to the subordinate the superior links the inbound messages with its specific branch qualifier (BQUAL) as well as a global transaction identifier (GTRID). The TM of each subordinate node receives syncpoint cues and is responsible for knowing who its superior is. In addition, the TM is responsible for recognizing the flow of branch instructions and guarantee that it uses a network-wide unique value for the branch values it generates for a given global transaction. With the recognition of the flow from the superior node the subordinate TM updates the node registry as to the inbound and outbound flow of branch messages by its superior and its subordinates.

18 Claims, 3 Drawing Sheets

METHOD FOR CREATING PATH-SENSITIVE BRANCH REGISTRY FOR CYCLIC DISTRIBUTED TRANSACTIONS

BACKGROUND OF THE INVENTION

1. Field of the Invention

The invention relates generally to a method for creating a path-sensitive branch registry for use in a processing system and, more specifically, to identifying branch flows as subordinate relative to a path in the distributed transaction tree.

2. Description of the Related Art

Currently, the method of managing distributed transactions used in computer systems includes a system of tree structures having a plurality of processing nodes which are logically connected. Normally, each node's transaction manager automatically increments its present identifier at the end of processing each transaction to derive the next transaction identifier. When a distributed transaction is forced into a consistent state its associated superior/subordinate relationship becomes fixed. Typically, a transaction identifier is incremented in each of the nodes of a superior transaction manager. Consequently, transaction tasks in the superior transaction manager then proceed with the incremented identifier to one or more subordinate transaction managers. Similarly, the subordinate nodes assign a static branch qualifier. However, the subordinate transaction manager's identifier is modified to conform with its superior. As is the case with transactions, superior nodes often times receive instructions from nodes indirectly from the superior's subordinates. This situation results in cyclic distributed transactions that contain at least one loopback. The current practice is unable to ensure the safe creation of cyclic distributed transactions, without worries of database update failures, or unwanted tightly coupled behavior.

In addition, typically, for modem object servers, the two phase commit process is preceded by a phase known as "before-completion." This process permits the object server to flush updates, cached in the object representation, to backing resource managers prior to the well-known two-phase commit process.

For distributed transaction trees that contain cycles, it is sometimes not possible for all updates to be pushed to the backing resource manager prior to that resource manager receiving the first part of the two-phase commit process. This will cause the resource manager to log an error, and commonly mark the global transaction rollback.

Therefore, there is a need for a method that unwinds the cyclical distributed transaction tree, while preserving the path for which the tree was allocated, regardless of the depth of the tree which maintains proper ordering of events and preventing unwanted sharing of resources.

SUMMARY OF THE INVENTION

An exemplary embodiment of the invention is a method for a path-sensitive branch registry for cyclic distributed transactions. This method has a superior node's transaction manager (TM) identifying itself as the root before sending syncpoint cues to at least one subordinate node. Before sending the syncpoint cues to the subordinate the superior links the cues with its specific branch qualifier (BQUAL) as well as a global transaction identifier (GTRID). The TM of each subordinate node receives syncpoint cues and is responsible for knowing who its superior is. In addition, the TM is responsible for recognizing the flow of branch instructions and guarantee that it uses a network-wide unique value for the branch values it generates for a given global transaction. With the recognition of the flow from the superior node the subordinate TM updates the node registry as to the inbound and outbound flow of branch instructions by its superior and its subordinates.

BRIEF DESCRIPTION OF THE DRAWINGS

Referring now to the drawings, wherein like elements are numbered alike in several FIGURES.

DETAILED DESCRIPTION OF THE INVENTION

As discussed herein, currently cyclic distribution trees cannot ensure the safe creation of cyclic distributed transactions, without worries of database update failures. The current practice requires that when a cycle occurs in a distributed transaction tree that the resultant reentrancy does not cause new work to occur after the resource manager has been directed to prepare for commit by the TM.

Figure 1:
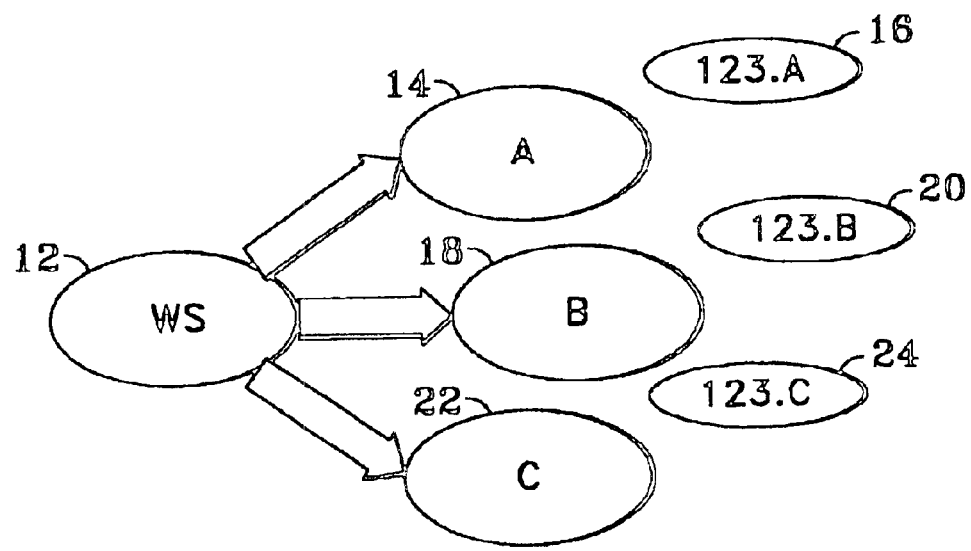
FIG. 1 is an exemplary diagram of a superior node and a subordinate node in the distribution transaction tree in one embodiment.

FIG. 1 is an exemplary diagram depicting a typical flow from a superior or root node to a subordinate node. Specifically, a root node 12 is sending syncpoint cues (outbound messages) of the distributed transaction tree to subordinate nodes represented as 14, 18 and 22. The subordinate nodes 14, 18 and 22 each have a specific global transaction identifier (GTRID) which is the same in each node of the tree, and unique in the network for each distributed transaction tree. The GTRID is assigned by a root coordinator, and is propagated as the transaction flows from node to node. FIG. 1 demonstrates GTRID naming with BQUALs 16, 20 and 24. In addition, each node of a distributed transaction can be referred to as a branch, and also, within each node resides a transaction manager (TM). The TM manages a branch registry, recording inbound and outbound participants. Inbound flows represent flows from a superior node in the distributed transaction tree. Further, each transaction has a unique identifier that represents a singleton instance of a given node in the distributed transaction tree. These unique identifiers are received by the subordinate node's TM and are generally statically bound. Next, the incremented identifier is sent to another subordinate node that is able to coordinate and process the particular syncpoint cues. All node transactions utilize registries that are managed by the node's TM. With this registry the TM is able to track the responsibilities of the superior node.

Figure 2:
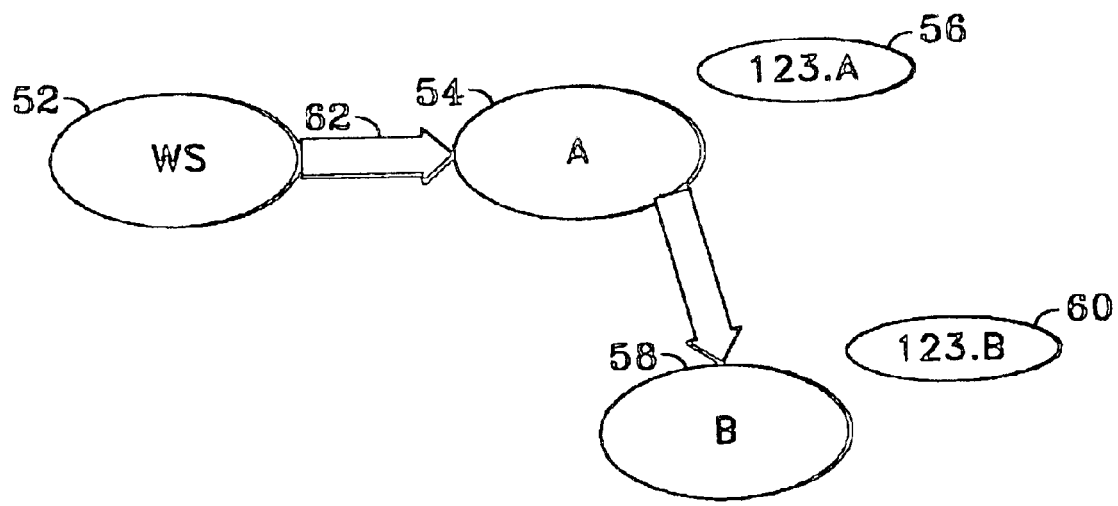
FIG. 2 is an exemplary diagram of a simple flow between nodes of the distribution transaction tree in one embodiment.

FIG. 2 is a diagram depicting a directed acyclic distributed transaction tree. A distributed WS node 52 usually has a well-known name that it uses as its branch qualifier (BQUAL) 56, 60. The distributed WS node 52 sends syncpoint cues in the form of outbound flow 62 to a subordinate node 54. The outbound flow is received as inbound flow 62 by the subordinate node 54. The TM of the subordinate node 54 examines its registry for the inbound flow's GTRID before proceeding. If the TM of the subordinate node 54 has not seen the incoming flow's 62 GTRID it will create a new branch in the registry for this transaction, and add the BQUAL to the inbound branch registry. If the TM of subordinate node 54 has seen the incoming flow 62, it uses the transaction that was created previously to coordinate updates to protected resources. Thus, the TM considers this reentry as a direct synchronous inbound flow because the distributed WS node 52 may flow to subordinate node 54 and to subordinate node 58 repeatedly with no update to BQUAL 60 prior to committing.

Figure 3:
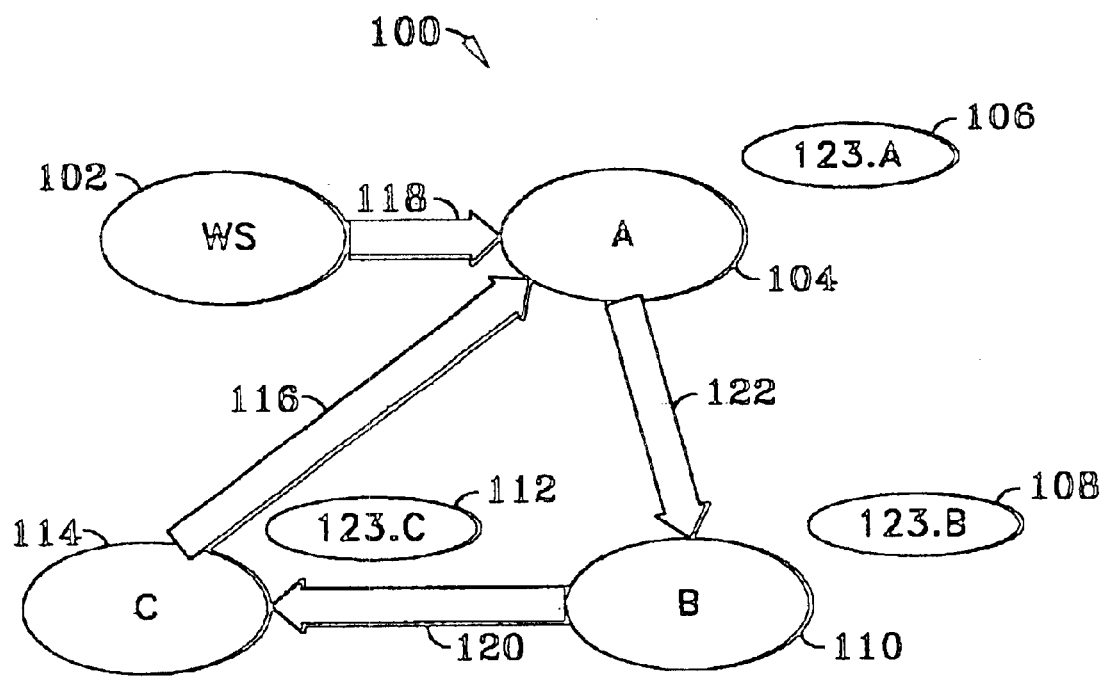
FIG. 3 is an exemplary diagram of a cyclical flow between nodes of the distribution transaction tree in one embodiment.

FIG. 3 is a diagram depicting a distributed transaction tree containing a cycle. Node 104 receives two inbound flows 116, 118; one from the WS node 102, and one from node 114. When node 104 receives the flow there is the possibility that it will erroneously assume that this is the same branch in the distributed tree that was noted before. If this branch is assumed to be the same as the one previously sent there will be a likelihood that there will be an unwanted sharing of protected resource locks. Further, node 104 may become confused with its syncpoint responsibilities. To correct this confusion, node 104 will receive a prepare flow from the WS node 102 and node 114 during the commit processing phase. Consequently, node 104 will be directed to prepare, for which it will drive pre-prepare instructions for all local resource managers, and after preparing will flow a prepare signal to node 110. In sending the prepare signal node 104 also sends its non-incremented BQUAL 106. Similarly, node 110 issues pre-prepare instructions and prepares local resources. Next, node 110 directs the flow to node 114 along with its non-incremented BQUAL 108. During the preparing of resources for node 114, it is possible that updates may flow to node 104. Consequently, the pre-prepare instruction of node 114 causes updates on node 104 and its non-incremented BQUAL 106, which has been previously prepared. Unfortunately, allowing updates on node 104 without incrementing the BQUAL 112 will invariably result in an error.

Figure 4:
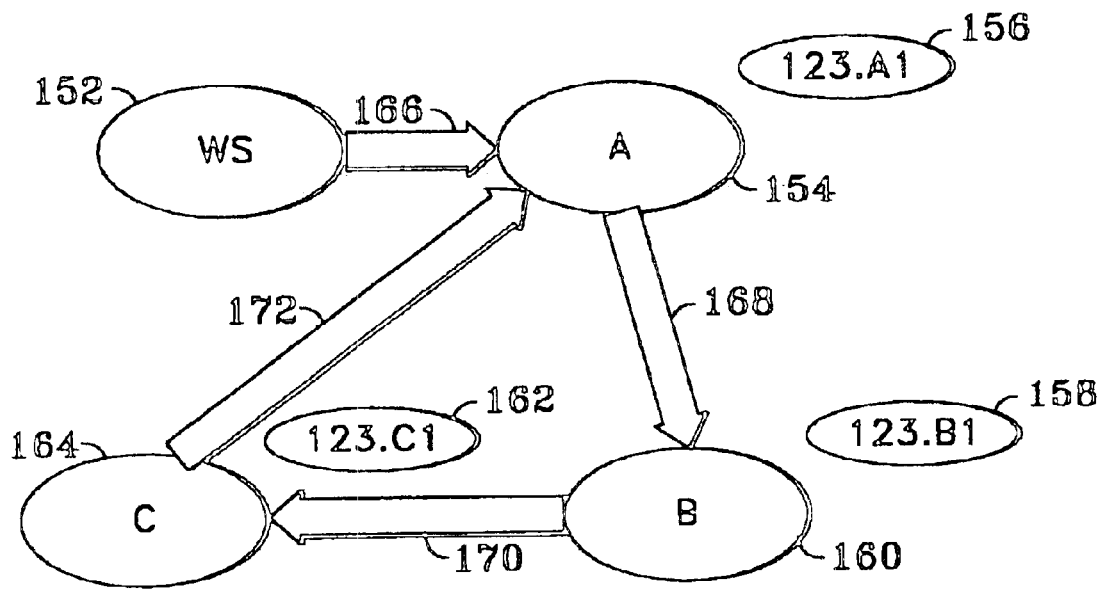
FIG. 4 is an exemplary diagram of a cyclical flow between nodes of the distribution transaction tree with path sensitivity in one embodiment.

FIG. 4 is a diagram depicting a solution to the problem introduced by cyclic distribution transaction trees by introducing a path-sensitive branch registry. Here, node 154 receives an inbound flow 166 from node WS 152. Node 154 does not find the inbound flow 166 from node WS 152 in its inbound registry. Next, node 154 will associate an indexed, transaction-unique BQUAL 156 (A1) with the inbound flow, where the index (1) indicates the number of times that the transaction has looped through the node 154. Subsequently, node 154 will send a flow 168 and its BQUAL 156 (A1) to node 160. Next, node 160 will receive the inbound flow 168, and associate its own indexed BQUAL 158 (B1) with the inbound indexed BQUAL 156 (A1). Likewise, node 160 sends a flow 170 with its indexed BQUAL 158 (B1) to node 164. The cycle completes when node 164 sends a flow 172 with its indexed BQUAL 162 (C1) to node 154, where node 154 will consult its inbound registry to see that it has not received an inbound flow from node 164 for this transaction, and will create a new BQUAL (A2) with an incremented index (2) that is different for any other index in the registry for that node for that transaction. Therefore, the cyclic flow, WS→A→B→C→A has become the acyclic flow WS→A1→B1→C1→A2.

Figure 5:
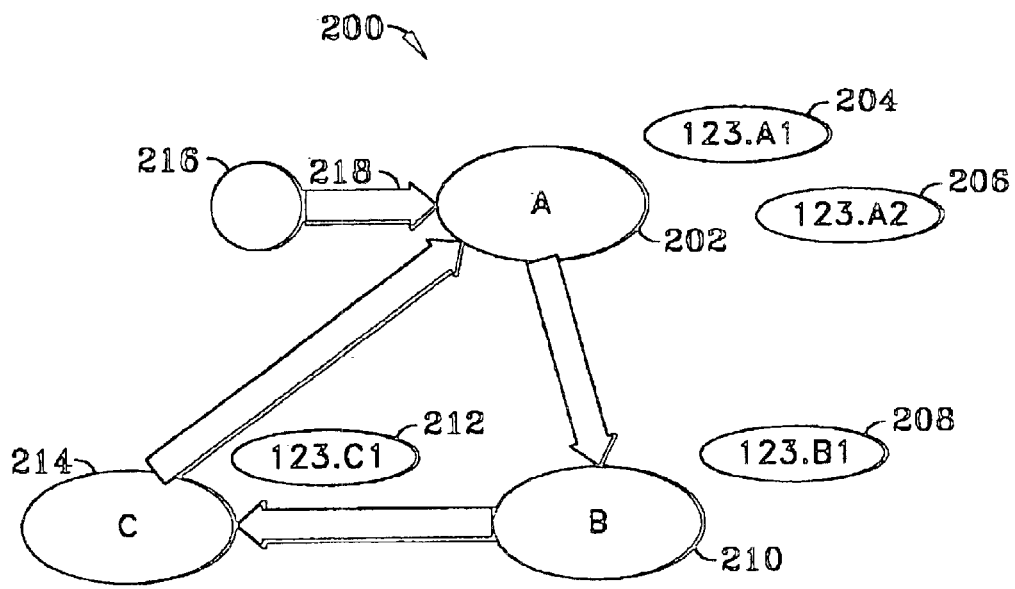
FIG. 5 is an exemplary diagram of an acyclical flow between nodes of the distribution transaction tree with path sensitivity in one embodiment.

FIG. 5 is a diagram depicting a creation of a path-sensitive registry. Node 202 is a subordinate of node 214 and other nodes based on the inbound flows 218. Node 202 is a superior to node 210. As in FIG. 3, WS will deliver a prepare instruction to node 202, in turn node 202 will issue pre-prepare instructions to the local resources. Node 202 will then prepare local resources, and flow prepare to node 210. Next, node 210 flows prepare to node 214. Consequently, after preparing local resources node 214 flows prepare to node 202. Following the prepare of the local resources node 202 then pre-prepares local resources associated with this subordinate transaction. Therefore, the path-sensitive registry prevents the unwanted sharing of database and/or protected resource locks and correctly delivers pre-prepare to objects and prepare to resources. The unwanted sharing of database and/or protected resource locks and correct delivery of pre-prepare objects is achieved by incrementing BQUALs 204, 206, 208 and 212 before they are sent to another node.

Figure 6:
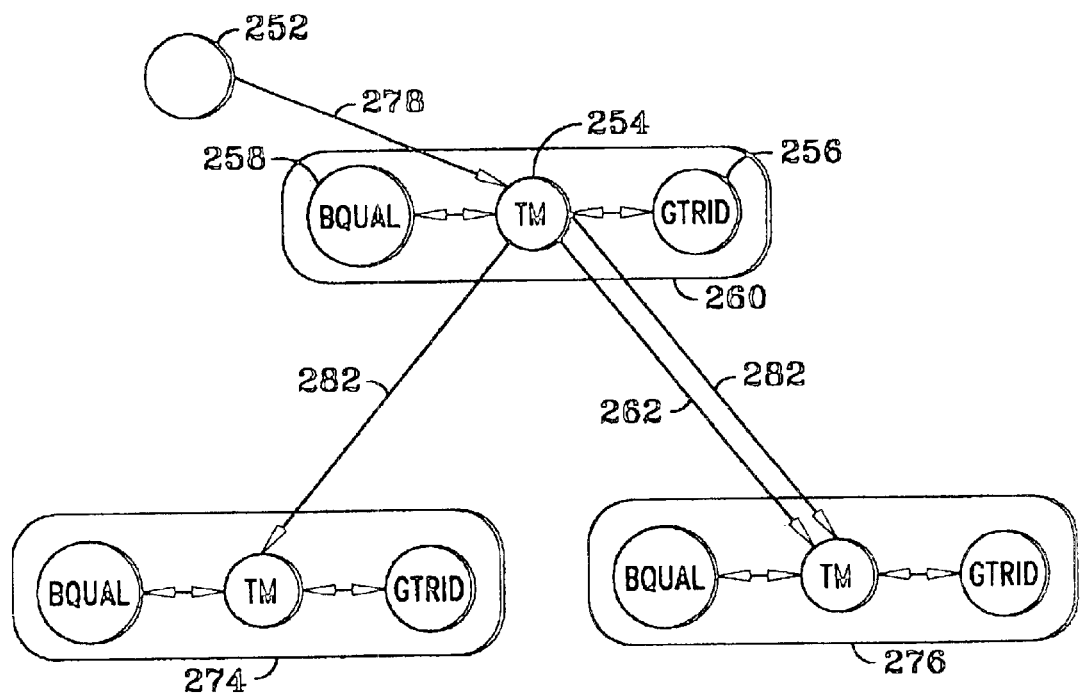
FIG. 6 is an exemplary diagram that illustrates the interrelationship between superior and subordinate transaction managers in one embodiment.

FIG. 6 is a diagram depicting the relationship between transaction managers and their subordinates. As in FIG. 3, WS 252 represents a root transaction. The TM 254 of node 260 receives inbound flow 278 from the transaction root 252 and evaluated against the inbound registry of the node. Specifically, an inbound registry contains the node's BQUAL 258 and its GTRID 256. The TM 254 compares incoming syncpoint cues with those stored in the memory. When the TM 254 does not find a matching syncpoint cue it adds the incoming syncpoint cue to its registry and increments its BQUAL and links it to the syncpoint cue prior to sending it to its subordinate(s). In addition, the registry contains the node's BQUAL 258. For example, node 260 sends outbound flow to node 276 and node 274. The TM of a subordinate node 254 searches its registry to see if the inbound flow's GTRID matches any previously recorded GTRID. If there is no match the TM 254 directs the recording of the new GTRID. If there is a match the TM 254 renames the transaction and sends the newly named flow 282 to its subordinate(s), and so on. Next, the subordinate nodes 274 receives the outbound flow 282 and reports back to the superior node 260, confirming its subordinate status.

The embodiment described above solves the problems by introducing a method that unwinds the pretzel-like situations created by cyclic flows. This method ensures that transaction managers are able to properly drive the syncpoint cues with the proper superior or root TM in the transaction. In addition, the exemplary embodiment described above enables the safe creation of cyclic distributed transactions, free from database update failures.

The preferred embodiment uses a optimization that fully prepares the nodes at the same depth in the synchronization tree, and at completion of the prepare phase if there are distributed subordinate registrations for the related transactions. In addition, the superior nodes receive a prepare signal to initiate node registration. During the start of the prepare phase, the subordinate will drive locally registered synchronization objects before completion methods are run, and so on. Consequently, this optimization can cause the object server to attempt to drive "work after prepare" to the resource managers in the case of a cyclic tree. This application preserves the performance optimization while properly delivering the "work before prepare" instructions.

This invention ensures that loopbacks do not cause unwanted database back sharing. If sharing is attempted from the loopback node, a deadlock will occur to protect the resource manager from corruption.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention not be limited to the particular embodiments disclosed for carrying out this invention, but that the invention will include all embodiments falling within the scope of the appended claims.

What is claimed is:

1. A method for managing a distributed transaction comprising one or more transaction flows between respective pairs of nodes in a network of interconnected nodes, each of said transaction flows being accompanied by an originating node identifier identifying the originating node, said method being performed by one of said nodes as a local node and comprising the steps of:

maintaining a registry comprising zero or more entries corresponding to inbound flows from other nodes, each of said entries containing the originating node identifier accompanying the corresponding inbound flow and a local node identifier identifying the local node, said local node identifier being used to identify the local node in outbound transaction flows to other nodes resulting from said inbound flow;

upon receiving an inbound flow from another node, determining whether there is an entry in said registry for the originating node identifier accompanying said inbound flow;

if there is no entry for said originating node identifier and there is no entry for another inbound flow for the same transaction, creating an entry in said registry containing said originating node identifier and a local node identifier identifying the local node; and if there is an entry for another inbound flow for the same transaction, creating an entry in said registry containing the originating node identifier accompanying said inbound flow and a local node qualifier identifying the local node that is different from any other local node identifier in said registry for that transaction.

2. The method of claim 1 in which said local node identifier contains an index portion that is incremented from a previous value if there is no entry for said originating node identifier and there is an entry for another inbound flow for the same transaction.

3. A method for providing a path-sensitive branch registry for cyclic distributed transactions, comprising:

receiving a flow from a superior node in a cyclic distributed transaction tree, the flow including a global tree identification and a branch qualifier;

for each subordinate node in the transaction tree:
      searching a registry of the subordinate node for the global tree identification and the branch qualifier;
      if there is no entry for said global tree identification and there is no entry for another inbound flow for the same transaction, creating an entry in said registry containing said global tree identification and a branch qualifier identifying the subordinate node; and
      if there is an entry for another inbound flow for the same transaction, creating an entry in said registry containing the global tree identification accompanying said inbound flow and a branch qualifier identifying the subordinate node that is different from any other branch qualifier in said registry for that transaction.

4. The method of claim 3, wherein the global tree identification identifies a transaction and the branch qualifier identifies a node in the transaction tree.

5. The method of claim 3, wherein the assigning a unique transaction branch qualifier to the flow includes updating the registry of the subordinate node.

6. The method of claim 3, wherein the flow includes syncpoint cues.

7. The method of claim 6, wherein the superior node includes a transaction manager, the transaction manager linking the syncpoint cues with the branch qualifier and the global transaction identification.

8. The method of claim 3, wherein each of the subordinate nodes include a transaction manager, the transaction manager of the subordinate nodes receiving syncpoint cues for the super node and sending confirmation to the superior node of the subordinate relational status.

9. The method in claim 8, wherein said superior node and said subordinate node recognize relational status based on said syncpoint cues linked with said branch qualifier and said global transaction identification; wherein said branch qualifier is established and unique for the life of the transaction.

10. The method in claim 8, wherein said subordinate relational status is updated based on the flow of said syncpoint cues.

11. A system for utilizing a path-sensitive branch registry for cyclic distributed transactions, the system comprising:

a plurality of nodes in a cyclic distribution tree, the plurality of nodes include a superior node and subordinate nodes;

a flow initiated by the superior node and received by a first of the subordinate nodes, the flow including a global tree identification and a branch qualifier;

wherein for each subordinate node in the transaction tree:
      a registry of the subordinate node is searched for the global tree identification and the branch qualifier;
      if there is no entry for said global tree identification and there is no entry for another inbound flow for the same transaction, an entry is created in said registry containing said global tree identification and a branch qualifier identifying the subordinate node; and
      if there is an entry for another inbound flow for the same transaction, an entry is created in said registry containing the global tree identification accompanying said inbound flow and a branch qualifier identifying the subordinate node that is different from any other branch qualifier in said registry for that transaction.

12. The system of claim 11, wherein the global tree identification identifies a transaction and the branch qualifier identifies a node in the transaction tree.

13. The system of claim 11, wherein the assigning a unique transaction branch qualifier to the flow includes updating the registry of the subordinate node.

14. The system of claim 11, wherein the flow includes syncpoint cues.

15. The system of claim 14, wherein the superior node includes a transaction manager, the transaction manager linking the syncpoint cues with the branch qualifier and the global transaction identification.

16. The system of claim 11, wherein each of the subordinate nodes include a transaction manager, the transaction manager of the subordinate nodes receiving syncpoint cues for the super node and sending confirmation to the superior node of the subordinate relational status.

17. The method in claim 16, wherein said superior node and said subordinate node recognize relational status based on said syncpoint cues linked with said branch qualifier and said global transaction identification; wherein said branch qualifier is established and unique for the life of the transaction.

18. The method in claim 16, wherein said subordinate relational status is updated based on the flow of said syncpoint cues.

* * * * *